United States Patent [19]

Ragsdale, Sr.

[11] Patent Number: 4,886,391
[45] Date of Patent: Dec. 12, 1989

[54] ATTACHING MEANS AND METHOD

[76] Inventor: Frank D. Ragsdale, Sr., Rte. 11, Box 387, Winston-Salem, N.C. 27107

[21] Appl. No.: 146,176

[22] Filed: Jan. 20, 1988

[51] Int. Cl.⁴ ............................................. F16B 17/00
[52] U.S. Cl. ...................................... 403/19; 403/16; 403/371; 403/368
[58] Field of Search .................. 403/16, 19, 371, 368; 29/259, 263

[56] References Cited

U.S. PATENT DOCUMENTS

| D. 208,428 | 8/1967 | Holliday | D54/9 |
| 1,038,834 | 9/1912 | Bloom | 403/371 |
| 1,382,606 | 6/1921 | Norton | 403/371 |
| 1,607,273 | 12/1923 | Hecht | 411/432 |
| 1,607,274 | 10/1924 | Hecht | 411/432 |
| 2,043,272 | 6/1936 | Wallgren | 403/371 |
| 3,000,673 | 3/1959 | Lansing | 301/128 |
| 3,799,026 | 4/1971 | Selch | 85/33 |
| 4,364,687 | 12/1982 | Adell | 403/16 |
| 4,589,180 | 5/1986 | Vachon | 29/263 |
| 4,657,458 | 4/1987 | Woller et al. | 411/182 |
| 4,692,078 | 9/1987 | Dessouroux | 411/231 |

FOREIGN PATENT DOCUMENTS 689849 6/1930 France .................................. 29/263

OTHER PUBLICATIONS

Rockwell Brochure © 1986, "New 13,000–21,000 16 Single Speed Drive Axles".

Primary Examiner—Randolph A. Reese
Assistant Examiner—Carol I. Bordas

[57] ABSTRACT

An attachment device is provided by joining a first structural member to the threaded stud of a second structural member by an attaching means which includes a flanged main body that has a tapered portion. A nut tightens the attachment device into an aperture of the first structural member and a removal tool is used to remove the attachment device when desired.

8 Claims, 2 Drawing Sheets

ATTACHING MEANS AND METHOD

BACKGROUND OF THE INVENTION

1. Field of the Invention

The present invention relates to apparatus and methods for attachment of structural parts to each other and particularly to the attachment of a plate to a structural member having studs extending therefrom for positioning through apertures in the plate. Threaded nuts are affixed to the studs to secure the apertured plate to the threaded stud.

2. Description of the Prior Art And Objectives of the Invention

Truck wheel axles and other devices often utilize threaded studs for attachment purposes, for example to affix an axle cover plate to a threaded stud bearing structure. The plate with apertures therein is placed over the studs and nuts are used to tighten the nut on the stud against the plate to hold the plate to the studded structure. After a long period of use the nuts can loosen and the axle leak. Attaching means have been invented in the past such as in U.S. Pat. No. 1,607,274 whereby a contractible member is placed over the threaded stud prior to tightening a nut thereon. As the nut is tightened against the complementary segmental section the segmental section is forced into engagement with the walls of the hole and the plate is therefore firmly engaged with the stud bearing member. While prior devices of this nature provides a secure method of attachment, removal of same is usually difficult and can be practically impossible once the parts have corroded.

With the knowledge and difficulties of removing attachment means of prior inventions, one of the objectives herein is to provide an attaching means for securing a plate to a structural member or the like which is both convenient and easy to attach and which can later be readily removed after long periods of use.

It is still another objective of present invention to provide an attaching means which includes a main body having a conically shaped portion, a cylindrical portion and a flange.

It is still another objective of present invention to provide an attaching means with a main body which is slotted.

Also an objective of the invention to provide an attaching means removal device which includes a cylindrical housing and a threaded member with the housing having a circumferential groove for receiving the attaching means during removal.

It is still another objective of invention to provide a method for removing a flanged attaching means which is positioned on a stud from within an aperture.

Other objectives and advandtages of present invention will become apparent to those skilled in the art as a more detailed description of the invention as presented below.

SUMMARY OF THE INVENTION

The invention herein relates to a means for attaching a plate or other structural member having apertures to a second structural member having threaded studs extending therefrom. The attachment devices are positioned over the threaded studs and are wedgeable into the apertures of the plate by tightening nuts thereagainst. The attachment device can be removed with use of a tool designed for this purpose which includes a housing having a circumferential groove and a threaded member. Removal of the attachment device comprises placing the housing of the removal tool over the flange of the attachment device and by tightening the threaded member of the tool the attachment device is forced from the aperture.

BRIEF DESCRIPTION OF THE DRAWINGS

The drawings of

DESCRIPTION OF THE PREFERRED EMBODIMENT

The preferred form of the attachment device includes a main body having a terminal flange. Connected to the terminal flange is a cylindrical portion and a tapered or conical section is affixed to the cylindrical portion. A slot extends from the flange through the cylindrical portion and conical section. The preferred form of the attachment device removal tool includes a cylindrical shaped housing having a threaded member positioned therein. Disposed internally within the cylidrical housing is a circumferential groove. A grip is positioned on the end of the threaded member exteriorly of the housing. The preferred method of removal of the attachment means consists of placing the flange of the attaching means in the circumferential groove of the removal tool and by rotating the tool threaded member in a clockwise direction the attachment device is forced from its position within an aperture of a plate or other structure.

DETAILED DESCRIPTION OF THE DRAWINGS AND OPERATION OF THE INVENTION

Figure 1:
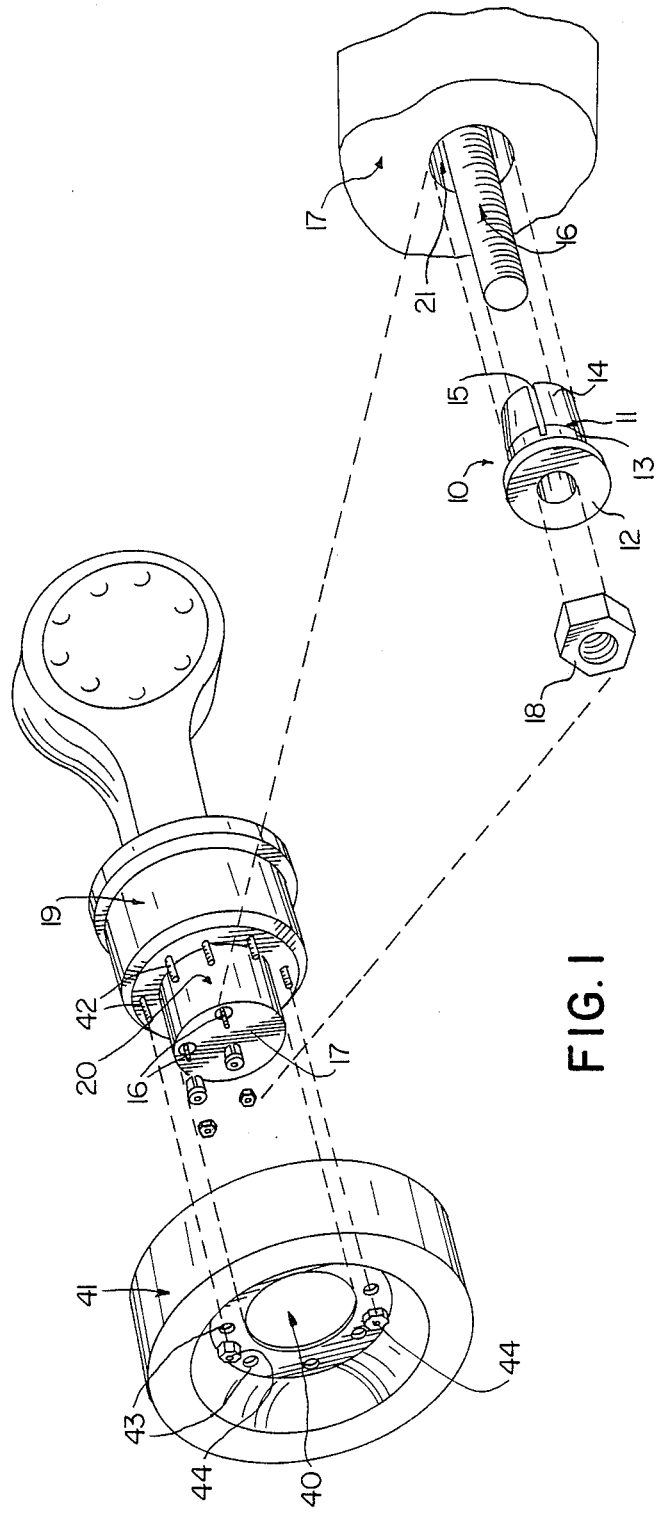
FIG. 1 demonstrates a truck axle with the wheel removed therefrom and with a partial axle cover plate, stud, attachment device and nut shown in enlarged fashion.

A device is for attachment of one structural member to another is illustrated by attaching means 10 in FIG. 1 which includes a main body 11 and a flange 12. Main body 11 includes a cylindrical portion 13 and a tapered portion 14. Attaching means slot 15 extends from tapered portion 14 to cylindrical portion 13. Attaching means 10 is substantially hollow and threaded stud 16 which extends through axle plate 17 will pass through attaching means 10 as shown in FIG. 1. Nut 18 is tightenable along stud 16. As further shown in FIG. 1. axle plate 17 fits over the end of hub 20 to secure axle plate 17 to axle hub 20. Axle 19 may be for example a heavy duty truck axle and axle plate 17 must be removed from time to time during repair and maintenance and therefore removing attaching means 10 as seen in Fig. 1 is of extreme concern and importance. It is understood that attaching means 10 can be used with a variety of structural devices which have studs extending from one structure member through a plate or other apertured structure and a tightening device such as a nut is used to secure structures together.

Figure 2:
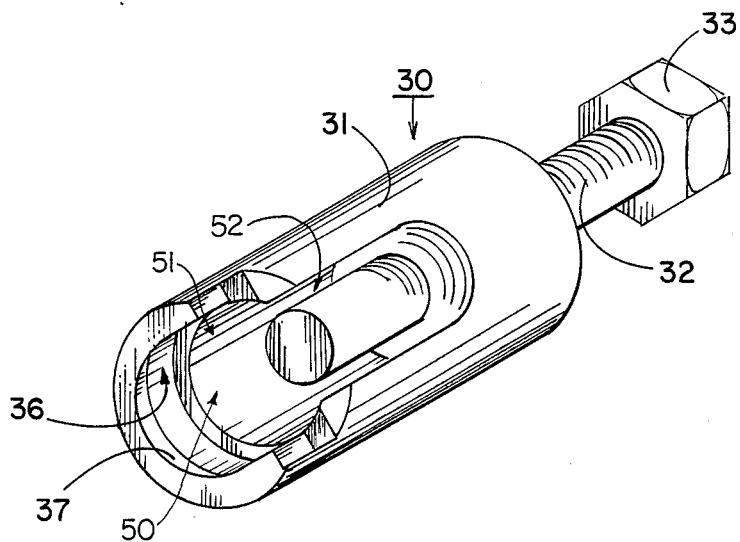
FIG. 2 shows the attachment device removal tool in perspective view.
Figure 3A:
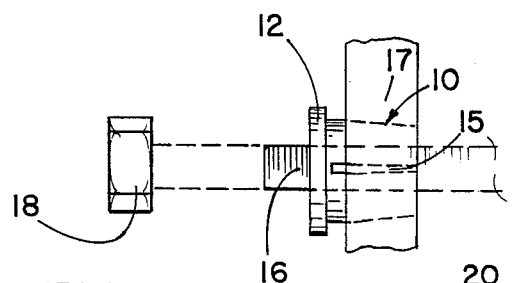
FIG. 3 illustrates the steps in the method of use of the removal tool and with the attachment device within the cover plate aperture.
Figure 3B:
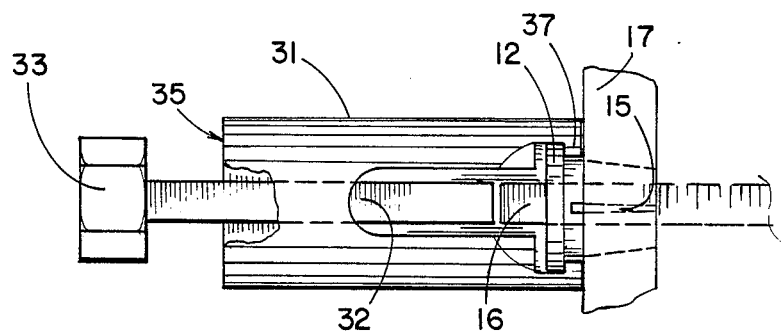
Figure 3C:
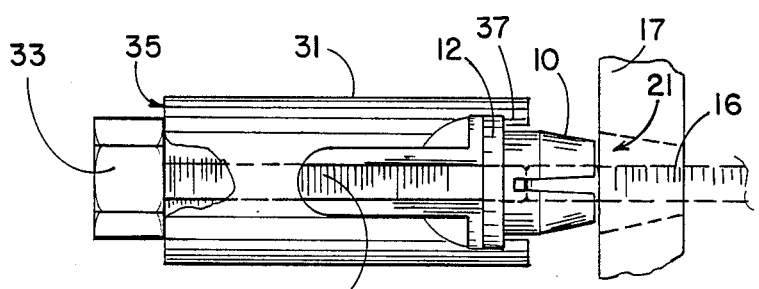

As seen in FIG. 3a, nut 18 is tightened on threaded stud 16 and attaching means 10 will be forced into aperture 21. As attaching means 10 is forced further into aperture 21, slot 15 will close to grip stud 16 as seen in FIGS. 3a and 3b. Cylindrical portion 13 of attaching means 10 will not enter aperture 21 yet tapered or conical portion 14 will pass therethrough causing slot 15 to close. As also shown, flange 12 will not contact axle plate 17 but will remain distant therefrom the axial length of cylindrical portion 13. Removal tool 30 as shown in FIG. 2 consists essentially of a cylindrical housing 31, threaded member 32 and grip 33. Housing 31 is threaded on closed end 35 as shown in FIG. 3b and 3c, and rotation of grip 33 causes threaded member 32 to move in and out of housing 31 as explained in more detailed below. Circumferential groove 36 is sized to receive flange 12 and housing lip 37 will fit between flange 12 and axle plate 17 as shown in FIG. 3b.

An exterior longitudinal slot 50 is seen in housing 31 in FIG. 2 with a relatively wide front or mouth 51 and an elongated thin neck portion 52 which extends rearwardly from circumferential groove 36.

Attaching means 10 is removed from stud 16 by placing housing 31 over attaching means 10 with flange 12 nesting in circumferential groove 36 as seen in FIG. 3b. It will be understood that nut 18 is first removed from stud 16 prior to placing removal tool 30 on flange 12 after removal tool 30 is so placed. Grip 33 is rotated in a clockwise direction to direct threaded member 32 inwardly into contact with threaded stud 16 and by additionally turning grip 33 as shown in FIG. 3c, attaching means 10 moves out of aperture 21 on axle plate 17. Slot 15 of attaching means 10 as shown in FIG. 3c remains opened since attaching means 10 is made from tempered steel or other materials. After attaching means 10 has been freed from aperture 21, grip 33 can be rotated in a counter-clockwise direction and thereafter attaching means 10 can be lifted from housing 31 and removal tool 30 is again available for use.

Attaching means 10 allows a structure such as axle 19 having a series of threaded studs 16 to capture and securely hold in place axle plate 17 which includes a number of apertures 21.

As seen in FIG. 3a, a second structural member such as axle plate 17 is securely held to axle 19 by a combination of attaching means 10, threaded stud 16 and nut 18. Once nut 18 is removed from stud 16, removal tool 30 as shown in FIG. 2 can be used to extract attaching means 10 even after long periods of use and after rust and corrosion have tenaciously joined attaching means 10 to the walls of aperture 21. In FIG. 1 axle plate 17 fits through opening 40 of wheel 41 and wheel 41 is affixed to axle 19 by studs 42. Studs 42 slide through openings 43 and as would be understood wheel 41 is secured by nuts 44.

The illustrations and examples provided herein are for explanatory purposes and are not intended to limit the scope of the appended claims.

I claim:

1. An attaching means comprising: a main body, and an uninterrupted flange, said flange having a full flat front face, said flange joined to said body, said body including a conical portion and a cylindrical portion, said cylindrical portion having a diameter larger than said conical portion, said cylindrical portion joined to said flange, said body portion defining a smooth longitudinal bore and said body portion defining a slot, said slot extending from said conical portion substantially to said flange.

2. Am attaching means as claimed in claim 1 wherein said body portion defines a pair of slots.

3. An attaching means as claimed in claim 1 formed from steel.

4. A means to attach a first structural member to a second comprising the combination of:
   a. a threaded stud joined to a first structural member and positioned in an aperture defined by a second structural member,
   b. an attaching means, said attaching means having a main body and a flange, said body including a conical portion and a cylindrical portion, said body portion defining a smooth longitudinal bore, said conical portion joined to said cylindrical portion and said cylindrical portion joined to said flange, said cylindrical portion having a diameter larger than the aperture defined by said second structural member, said conical portion sized to fit within the aperture, said body portion for positioning on said threaded stud, and
   c. a tightening means for directing against said flange of said attaching means to urge said attaching means along the threaded stud into the defined aperture while maintaining said flange spaced from said second structural member to thereby hold said first structural member to said second structural member and to allow convenient removal of said attaching means.

5. The combination as claimed in claim 4 whereas said main body of said attaching means defines a slot.

6. A method of removing a flanged attaching means which is mountable on a threaded stud and positioned within an aperture, the removal occuring by forcing said attaching means from said aperture by the use of a removal tool, said tool having a housing and a rotatable threaded member therein, said housing including an interior circumferential groove for receiving said attaching means flange, the method comprising the steps of:
   (a) placing said attaching means flange into the circumferential groove of said housing, and
   (b) rotating the threaded member to direct said member into the attaching means to thereby force the attaching means from the stud and out of the aperture.

7. The method of claim 6 wherein the step of rotating the threaded member includes the step of rotating the threaded member againt the threaded stud.

8. The method of claim 6 wherein rotating the threaded member to direct said member into the attaching means comprises sliding the attaching means along the threaded member.

* * * * *